United States Patent [19]
McCoy et al.

[11] 4,448,697
[45] May 15, 1984

[54] SECONDARY RECOVERY PROCESS

[75] Inventors: David R. McCoy; Robert M. Gipson, both of Austin, Tex.

[73] Assignee: Texaco Inc., White Plains, N.Y.

[21] Appl. No.: 341,962

[22] Filed: Jan. 22, 1982

[51] Int. Cl.³ .......................... E21B 43/22; C09K 3/00
[52] U.S. Cl. .............................. 252/8.55 D; 166/274; 166/275; 252/DIG. 1
[58] Field of Search .................. 252/8.55 D, DIG. 1; 166/274, 275

[56] References Cited

U.S. PATENT DOCUMENTS 3,539,519 11/1970 Weimer .......................... 252/DIG. 1
3,792,731 2/1974 Feuer Bacher et al. ............ 166/274
3,811,505 5/1974 Flournoy et al. .................. 166/274
4,059,154 11/1977 Braden, Jr. et al. ................. 166/274
4,165,785 8/1979 Schieuelbein ................. 252/8.55 D
4,269,271 5/1981 Shupe et al. ........................ 166/274
4,293,428 10/1981 Gale et al. ........................... 166/274
4,360,061 11/1982 Canter et al. ...................... 166/274
4,371,444 2/1983 McCoy et al. ...................... 166/275

Primary Examiner—Christine M. Nucker
Attorney, Agent, or Firm—Jack H. Park; Walter D. Hunter; Richard A. Morgan

[57] ABSTRACT

Hydrocarbons are recovered from a subterranean hydrocarbon-bearing formation penetrated by an injection well and a production well by displacing hydrocarbons toward the production well using an aqueous drive fluid such as water or brine containing dissolved therein:

(a) a small amount of a nonionic surfactant formed by reacting an alcohol having not more than 6 carbon atoms or phenol first with butylene oxide and then with ethylene oxide and (b) a small amount of an anionic sulfate or sulfonate surfactant. Optionally the drive fluid may be saturated with natural gas, nitrogen and/or carbon dioxide at the injection pressure. A polymeric thickening agent also may be included in the drive fluid, if desired.

10 Claims, No Drawings

SECONDARY RECOVERY PROCESS

BACKGROUND OF THE INVENTION

1. Field of the Invention

This invention relates to a process for recovering hydrocarbons from a subterranean hydrocarbon-bearing formation penetrated by an injection well and a production well wherein an aqueous drive fluid such as water or brine containing dissolved therein:

(a) a small amount of a nonionic surfactant and
(b) a small amount of an anionic sulfate or sulfonate surfactant is utilized to displace hydrocarbons in the formation toward a production well.

2. Description of the Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery in this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place since the crude is tightly bound to the sand particles of the formation. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

The salinity sensitivity of the most desirable surfactants for use in oil recovery has a substantial impact on the economics of a proposed supplemental recovery operation employing a surfactant. While it has been generally recognized in the industry for many years that surfactants capable of reducing the interfacial tension between the injected fluid and the formation petroleum would improve the oil recovery efficiency of a supplemental oil recovery program, it has never been demonstrated that the additional oil which can be recovered under field conditions is sufficient to justify the cost of the surfactant. This is especially true because of the enormous quantity of surfactant which must be employed in a field, in order to have a significant effect on the displacement efficiency. If high formation water salinity results in a shift in surfactant choice to a higher cost material or if a greater concentration of surfactant must be used, the cost of a surfactant flood will be increased substantially. It is known, however, that many millions of barrels of oil remain unrecovered in a petroleum reservoir at the conclusion of conventional water flooding operations, and with an impending shortage of readily recoverable crude oil, it is becoming a matter of paramount national importance to devise a reasonably economical method of recovering this oil. Typical surfactant type recovery processes are described in U.S. Pat. Nos. 3,333,634; 3,714,062; 3,712,377; 3,827,497 and in 4,016,932.

There is a definite need in the art for a water flooding process employing surfactants which will function effectively in formations containing high salinity fluids and especially where such fluids contain a high concentration of divalent ions such as $Ca^{++}$ and $Mg^{++}$.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well an aqueous drive fluid comprising water or brine containing therein:
(a) a small amount of a nonionic surfactant of the formula:

$$RO(R'O)_m(CH_2CH_2O)_nH,$$

wherein R is selected from the group consisting of an alkyl of 1 to 6 carbon atoms, phenyl and tolyl; R' is a 1,2- or 2,3-butylene radical, m is an integer from 1 to 40 and n is an integer of 10 or greater such that the resulting surfactant contains not less than 50 weight percent of oxyethylene units, and
(b) a small amount of an anionic sulfate or sulfonate surfactant,
(B) forcing the fluid through the formation and
(C) recovering hydrocarbons through the production well.

The surfactant compositions employed in the process of this invention are surprisingly soluble in saline waters containing both mono and divalent cations and these compositions are highly efficient when utilized in enhanced recovery processes for recovering oil from depleted wells.

An additional embodiment of this invention relates to the driving fluid compositions utilized in step (a) which may be saturated with carbon dioxide, nitrogen and/or natural gas, if desired. In still another embodiment, a minor amount of a water-soluble polymeric thickening agent such as polyacrylamide or partially hydrolyzed polyacrylamide may be included in the drive fluid.

The surfactant mixtures employed in the process of this invention are greatly superior to mixtures of anionic surfactants and available nonionic surfactants in stability and in ability to displace oil from high temperature formations containing high salinity brine with substantial amounts of divalent cations.

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferable that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent, particles having a Tyler mesh size of from about 8 to about 40 are preferred (i.e., from about 0.016 to about 0.093 inches).

Nonionic surfactants useful in this invention have the formula:

wherein R is selected from the group consisting of alkyl of 1 to 6 carbon atoms, phenyl and tolyl; R' is a 1,2- or 2,3-butylene radical; m is an integer from 1 to 40 and preferably from 3 to 15 and n is an integer of 10 or greater such that the resulting surfactant contains not less than 50 weight percent of oxyethylene units.

The nonionic surfactants described above can be prepared by alkoxylation methods well known in the art. For example, phenol can be reacted in the presence of potassium phenoxide in an autoclave equipped with a stirrer at a temperature of about 100° C. to about 150° C. with 2,3- or 1,2-butylene oxide pressured into the reactor with nitrogen to form butoxylated phenol which in turn can then be reacted with the required amount of ethylene oxide to yield the desired ethylene oxide adduct of the butoxylated phenol product.

The preparation of the ethylene oxide adducts of butoxylated n-butanol suitable for use in the invention is shown in Example I.

A number of other methods are set out in the art for conducting such alkoxylation reactions including those described in U.S. Pat. Nos. 2,131,142; 2,213,477; 2,233,381; 2,131,142; 3,879,475; 2,174,761; 2,425,845; 3,062,747; 3,380,765; 3,719,636; 3,879,475 and German Offen. No. 2,657,518 of July 7, 1977.

A wide variety of anionic sulfate or sulfonate surfactants can be employed in this secondary recovery process. One type of anionic sulfonate surfactant especially suitable for use in the process of this invention includes compounds of the formula:

wherein R is linear or branched chain alkyl having 6 to about 20 carbon atoms or R is the radical:

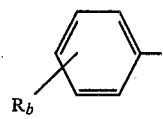

wherein $R_b$ is linear or branched chain alkyl of from about 6 to about 20 carbon atoms and M is a monovalent cation such as sodium, potassium or ammonium. Examples of such surfactants include ammonium dodecylsulfonate, sodium octadecylsulfonate, potassium octylbenzenesulfonate, sodium dodecylbenzenesulfonate, ammonium decylbenzenesulfonate, etc.

Another group of anionic sulfonate surfactants which may be utilized in this process includes compounds of the formula:

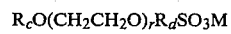

where $R_c$ is linear or branched chain alkyl of from 8 to about 20 carbon atoms or the radical

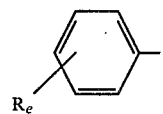

wherein $R_e$ is linear or branched chain alkyl of from 6 to about 20 carbon atoms, $R_d$ is alkylene of from 2 to 4 carbon atoms, r is an integer of from 1 to about 14 and M is a monovalent cation such as sodium, potassium, or ammonium.

Petroleum sulfonates which are presently among the more popular classes of anionic surfactants being considered for supplemental oil recovery techniques may also be used in this process. The various materials available under the general name of petroleum sulfonates vary in composition according to the petroleum fraction used for sulfonation and in the degree of sulfonation imparted to the petroleum fraction. A preferable petroleum sulfonate is described in U.S. Pat. No. 3,302,713 (1967) disclosing a petroleum sulfonate prepared from a petroleum fraction whose boiling range is from 700° F. to 1100° F. which corresponds to a molecular weight range of from about 350 to about 500. The sodium salt of the sulfonation product of this petroleum fraction is an excellent material for use in the subject invention.

Mixtures of petroleum sulfonates can also be employed as the anionic sulfonate component of the drive fluid utilized in this invention. For example, a mixture of a predominately water soluble petroleum sulfonate having an average equivalent weight of less than 400 and preferably less than 350 may be utilized along with a second petroleum sulfonate which is at least partially oil soluble and preferably part oil soluble and part water soluble and having an average equivalent weight of about 400 to about 600 and preferably about 450 to about 550.

Generally, the drive fluid of this invention will contain dissolved therein about 0.05 to about 6.0 or more weight percent of the previously described nonionic surfactant and about 0.03 to about 5 or more weight percent of the anionic sulfonate surfactant.

The drive fluid of the invention may contain, if desired, about 0.01 to about 3.0 or more weight percent of a water-soluble polymer, i.e., a thickening agent, in order to increase the viscosity of the fluid and thus improve the oil displacement capability of the subject fluid. Useful polymers include for example, polyacrylamide, partially hydrolyzed polyacrylamide, polysaccharide, methyl cellulose, polyethylene oxide, polyvinyl aromatic sulfonate, etc. An especially preferred thickening agent is polyacrylamide or partially hydrolyzed polyacrylamide of the type described by McKennon in U.S. Pat. No. 3,039,529. The molecular weights of such polyacrylamides which may be utilized in the drive fluid of this invention will range from about 200,000 to about 8,000,000 or more with the preferred range being from about 1,000,000 to about 6,500,000.

In some instances it may be desirable to include in the drive fluid an agent to prevent degradation of the thickening agent by bacterial action. Therefore, if desired, the drive fluid may contain along with polyacrylamide or partially hydrolyzed polyacrylamide or any other suitable thickening agent from about 0.01 to about 0.8 or more weight percent of, for example, of a water-soluble terpolymer comprising recurring E-type units of the formula:

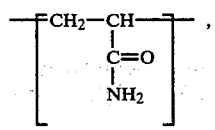

recurring F-type units of the formula:

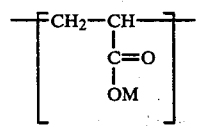

and recurring G-type units of the formula:

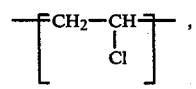

wherein M is selected from the group consisting of hydrogen, sodium, potassium and ammonia and wherein in the said terpolymer the weight percent of the E-type units ranges from about 60 to about 95, the weight percent of the G-type units ranges from about 2 to about 10 and with the balance being the F-type units. Generally, the number average molecular weight of the acrylamide-acrylic acid or the sodium, potassium or ammonium salt thereof-vinyl chloride terpolymers will range from about 50,000 to about 6,500,000 or more. These terpolymers can be prepared by the usual vinyl compound polymerization methods. Such methods are more completely described in detail in Norton et al in U.S. Pat. No. 3,779,917 and in Jahnke U.S. Pat. No. 3,892,720 both of which patents are incorporated herein in their entirety by reference. These same terpolymers may be employed as the sole thickening agent in the drive fluid in amounts of from 0.01 to about 3.0 or more weight percent. Additionally, inorganic salts such as NaCl, CaCl$_2$ and MgCl$_2$ which are typically found in field water or brine may be used in the drive fluid.

Optionally, the aqueous drive fluid of this invention may be saturated with carbon dioxide, nitrogen and/or natural gas at the injection pressure which generally will be from about 300 to about 10,000 psig or more.

This invention is best understood by reference to the following examples which are offered only as illustrative embodiments of this invention and are not intended to be limitative.

EXAMPLE I

A one-gallon stirred autoclave was charged with 250 g of butoxylated n-butanol having the formula:

and 1.5 g potassium hydroxide. The mixture was heated with nitrogen purging and mechanical stirring for one hour at 100° C. to remove water. Ethylene oxide (462, 10.5 mole) was next added with stirring at 120° C. The product (Surfactant IVa), which was characterized by hydroxyl number determination was identified as:

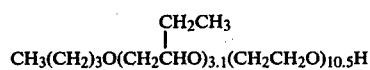

Synthetic Slaughter field concentrate was made up by adding 161 gram NaCl, 41.5 gram CaCl$_2$, 34.7 gram MgCl$_2$.6H$_2$O, 1 gram Na$_2$SO$_4$ and 0.3 gram NaHCO$_3$ to enough distilled water to prepare 1 liter of solution. One hundred grams of the concentrate was added to 134 grams of distilled water to make the synthetic Slaughter field brine used in this Example.

The 15.6-, 21- and 26.5-molar ethoxylate of 3.1-molar butoxylated n-butanol were also prepared in the same manner (Surfactant IVb, IVc and IVd) and analyzed. The following table of the results was prepared from the results of the analyses:

| Product | Moles Ethylene Oxide Added | 1% Cloud Point (°C.) in Synthetic Slaughter Brine |
|---|---|---|
| IVa | 10.5 | 56 |
| IVb | 15.6 | 63.5 |
| IVc | 21 | 73 |
| IVd | 26.5 | 76.8 |

In a similar manner, the 39-molar ethoxylate was prepared from:

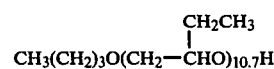

The resulting compound (Surfactant IVe) had a 1% cloud point in synthetic Slaughter brine of 73.5° C.

The products prepared in Example I were tested for hard water solubility in the following manner: A 20,000 ppm hard water was prepared by dissolving 50.2 g CaCl$_2$ and 61.2 MgCl$_2$.6H$_2$O in one gallon water. Using this water and a standard tridecyl benzene sulfonate, sodium salt, a series of solubility tests was run. Enough $H_2O$ was added to each solution to give a total of 2,000 ppm hardness in each test. Slow external heating of the solutions was used to determine the temperature at which a clear solution became cloudy (cloud point) and/or a cloudy solution became clear (Krafft point). The results of these tests are shown in Table I below:

TABLE I

| Wgt. % Tridecyl Benzene Sulfonate | Solubilizer (Wgt. %) | Cloud Pt. | Krafft Pt. |
|---|---|---|---|
| 1 wgt. % | None | — | >100° C. |
| None | Product IVa (1 wgt %) | 74.5° C. | — |
| None | Product IVb (1 wgt %) | 86° C. | — |
| 1 wgt. % | Product IVa (1 wgt. %) | 89.5° C. | <0° C. |
| 1 wgt. % | Product IVb (1 wgt. %) | >100° C. | 16° C. |
| None | Nonylphenol 12-molar ethoxylate (1 wgt. %) | 81.5° C. | — |
| 1 wgt. % | Nonylphenol 12-molar ethoxylate (1 wgt. %) | 20° C. | >100° C. |

The dual surfactant systems are seen to have lower Krafft points and higher cloud points than either (a) the nonionic surfactant alone, (b) the sulfonate surfactant alone, or (c) a similar dual surfactant system using a standard nonionic surfactant, nonylphenol 12-molar ethoxylate (Surfonic ®N-120) with cloud point intermediate between the two butylene oxide surfactants examined.

EXAMPLE II

In a field in which the primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at 1300 psig at a temperature of 75° F. containing dissolved therein about 0.92 weight percent of a nonionic surfactant of the formula:

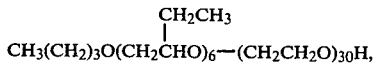

and about 0.46 weight percent of a petroleum sulfonate and containing dissolved therein 0.41 weight percent of an acrylamide-sodium acrylate-vinyl chloride terpolymer (81 weight percent acrylamide, 14 weight percent sodium acrylate with the balance being vinyl chloride) having a number average molecular weight of about 480,000 and 1.1 weight percent of polyacrylamide having a number average molecular weight of about 6,200,000 is injected via the injection well into the formation at a pressure of about 1300 psig and at the rate of 1.05 barrels per minute. Injection of the driving fluid is continued at the rate of about 1.05 barrels per minute and at the end of 87 days the rate of production of oil is substantially greater than with water injection alone.

What is claimed is:

1. A process for recovering hydrocarbons from a subterranean hydrocarbon-bearing formation penetrated by an injection well and a production well which comprises:
   (A) injecting into the formation via an injection well an aqueous drive fluid comprising water or brine containing therein:
      (a) from about 0.05 to about 6.0 weight percent of a nonionic surfactant of the formula:

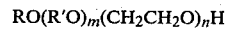

wherein R is selected from the group consisting of an alkyl of 1 to 6 carbon atoms, phenyl and tolyl; R' is a 1,2- or 2,3-butylene radical; m is an integer from 1 to 40 and n is an integer of 10 or greater such that the resulting surfactant contains not less than 50 weight percent of oxyethylene units, and
      (b) from about 0.03 to about 5 weight percent of an anionic sulfate or sulfonate surfactant,
   (B) forcing the said fluid through the formation, and
   (c) recovering hydrocarbons through the production well.

2. The process of claim 1 wherein in (b) the surfactant employed is a petroleum sulfonate.

3. The process of claim 1 wherein the said drive fluid is saturated with carbon dioxide at a pressure of about 300 to about 10,000 psig.

4. The process of claim 1 wherein the said drive fluid is saturated with natural gas at a pressure of about 300 to about 10,000 psig.

5. The process of claim 1 wherein the said drive fluid also contains about 0.01 to about 3.0 weight percent of a water-soluble polymer.

6. The process of claim 1 wherein the said drive fluid also contains about 0.01 to about 3.0 weight percent of polyacrylamide or partially hydrolyzed polyacrylamide having a number average molecular weight of from about 200,000 to about 8,000,000.

7. The process of claim 1 wherein the said drive fluid also includes dissolved therein about 0.01 to about 3.0 percent by weight of a terpolymer of acrylamide, acrylic acid or the sodium, potassiumm or ammonium salt thereof and vinyl chloride.

8. The process of claim 7 wherein the number average molecular weight of the said terpolymer of acrylamide, acrylic acid or the sodium, potassium or ammonium salt thereof and vinyl chloride is from about 50,000 to about 6,000,000.

9. The aqueous fluid comprising water or brine containing dissolved therein:
   (a) from about 0.05 to about 6.0 weight percent of a nonionic surfactant of the formula:

wherein R is selected from the group consisting of an alkyl of 1 to 6 carbon atoms, phenyl and tolyl; R' is a 1,2- or 2,3-butylene radical; m is an integer from 1 to 40 and n is an integer of 10 or greater such that the resulting surfactant contains not less than 50 weight percent of oxyethylene units, and
   (b) from about 0.03 to about 5.0 weight percent of an anionic sulfate or sulfonate surfactant.

10. The aqueous fluid of claim 9 which also contains therein from about 0.01 to about 3.0 weight percent of a water-soluble polymer.

* * * * *